Patented May 16, 1939

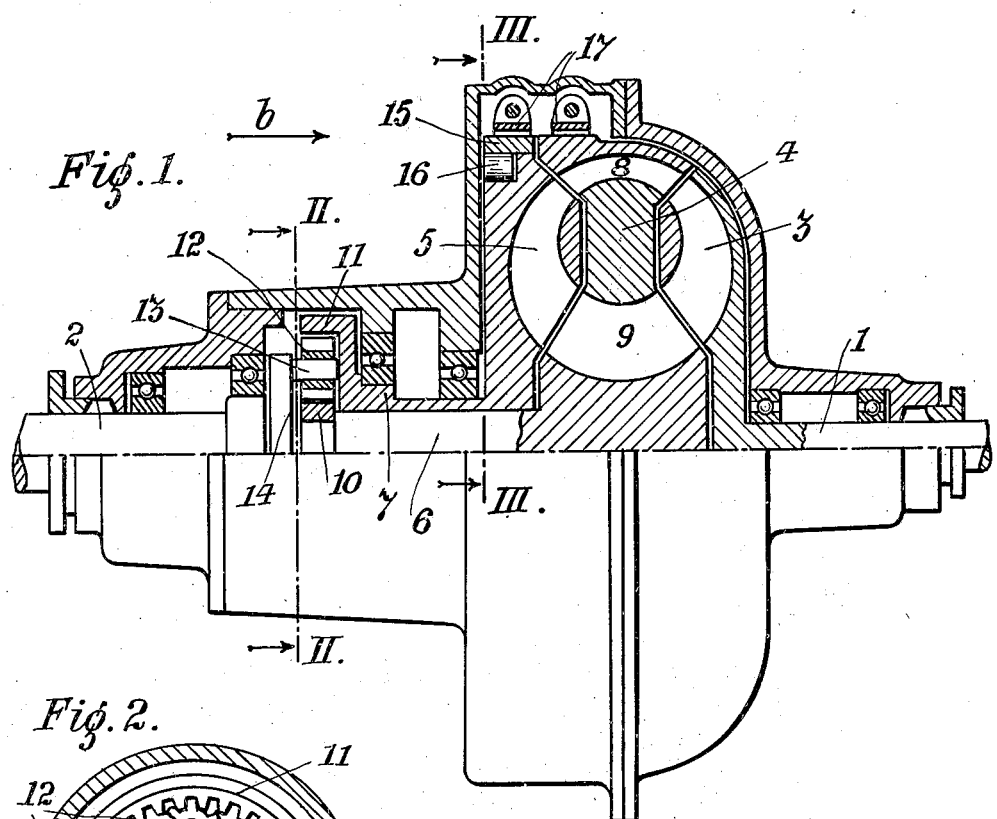
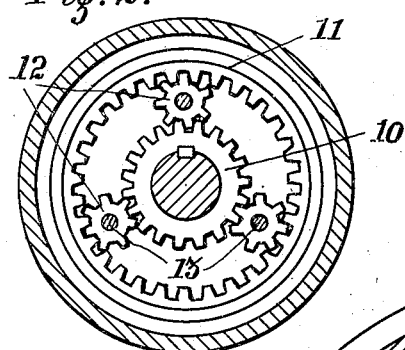
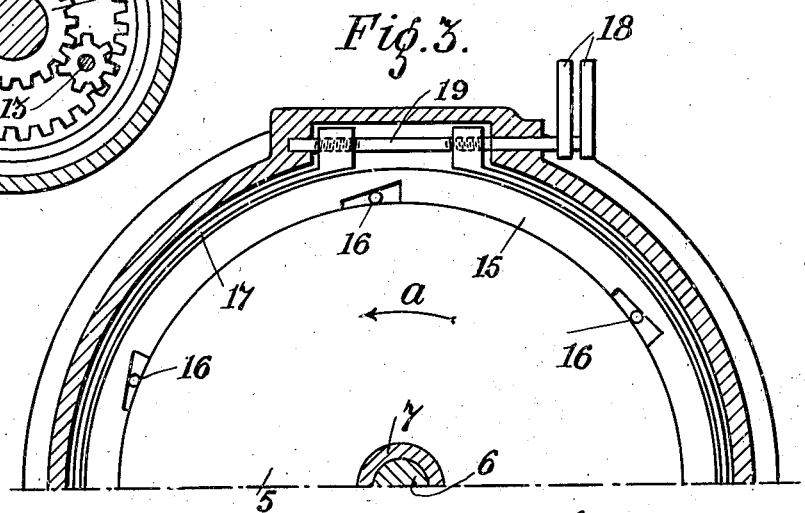

2,158,557

UNITED STATES PATENT OFFICE 2,158,557

TURBINE

Willem Petrus van Lammeren, Voorschoten, Netherlands

Application February 18, 1937, Serial No. 126,400
In Great Britain August 13, 1936

11 Claims. (Cl. 74—189.5)

This invention relates to hydraulic transmission gears or torque converters of the Föttinger type.

An aim of the invention is to provide a speed and torque converting medium between the vane elements and their driven shaft, thus increasing torque magnification and flexibility.

A further aim of the invention is to provide means connecting the vane elements to the driven shaft which function constantly, that is, do not require mechanical engagement and disengagement to effect reversing.

An object of the invention is to provide a hydraulic transmission gear comprising two vane elements adapted to function alternately as driven and guide elements, an epicyclic gear train whereof the sun wheel is connected to one of said elements, the internally toothed annulus is connected to the other of said elements and the planetary wheels are carried by the driven shaft; and means for alternately braking against rotation and releasing the said elements to cause them to exchange functions and thereby produce forward or reverse running of the driven shaft; the arrangement being such that the epicyclic gear train between the vane elements and the driven shaft produces in the latter, when one of the said elements is braked against rotation, an increased torque at correspondingly reduced speed relative to the rotating element.

In order that speed reduction of the driven shaft through the epicyclic gear train may only operate substantially when relatively heavy loads are imposed on the driven shaft, as, for example, when starting under load, a further object of the invention is to provide a one way or free-wheel clutch interposed between the vane element which functions as the guide element during forward operation and the means for braking same, the clutch being adapted, in conjunction with the braking means, to hold said element against rotation in the reverse direction and to permit said element to rotate in the forward direction, so that a decrease of load on the driven shaft causes the guide element to rotate in a forward direction under the varied action of the fluid stream, thus correspondingly rotating the sun wheel or internally toothed annulus, which ever it is connected to and producing an increase of speed of the driven shaft.

In order to produce an "over-drive" effect, i. e., a speed of driven shaft in excess of the speed of the driving shaft when relatively light loads are imposed on the driven shaft the vanes of the vane elements may, in accordance with a further object of the invention, be so formed that the guide element can rotate, under the action of the fluid stream, at a higher speed than the driven element so that the epicyclic gear train rotates the driven shaft at a higher speed than the driving shaft.

Embodiments of the invention will now be described by way of example, with reference to the accompanying drawing in which:

Fig. 1 is a part sectional elevation of a hydraulic transmission gear of the type described in my co-pending application 107,245 dated 23rd October, 1936 and incorporating the present invention.

Figs. 2 and 3 are sectional end elevations taken on the lines II—II and III—III respectively of Fig. 1.

Referring to Figs. 1, 2 and 3 of the drawing the driving shaft is indicated by 1 and the driven shaft by 2. The impeller 3 is carried by the driving shaft 1, and the intermediate driven vane wheel 4 and guide vane wheel 5 are respectively carried by a shaft 6 and a sleeve 7. The shaft 6 is rotatably journalled in the sleeve 7 and these are arranged in axial alignment with the shafts 1 and 2. The driven vane wheel 4 has two series of vanes, viz., 8 the 1st stage series and 9 the 2nd stage series.

At the ends of the shaft 6 and sleeve 7 are respectively carried the sun wheel 10 and internally toothed annulus 11 of an epicyclic gear train, of which the planetary wheels 12 are rotatable on spindles 13 carried by a flange 14 of the driven shaft 2.

A ring 15 encircles the guide vane wheel 5 and constitutes, in conjunction with the rollers 16, a freewheel brake for the said guide vane wheel; and brakes, comprising brake bands 17 operable by levers 18 through right- and left-hand screws 19, encircle the ring 15 and driven vane wheel 4. The arrangement of the aforesaid brakes and the free-wheel brake is such that application of the brake to the driven vane wheel 4 causes the latter to be held against rotation in either direction and application of the brake to the ring 15 causes the guide vane wheel to be held against rotation in the direction indicated by arrow $a$ (Fig. 3) but allows of its rotation in the opposite direction. The operation of the apparatus is as follows.

For forward operation, i. e., clockwise rotation of shafts 1 and 2 looking in direction of arrow $b$ (Fig. 1) the brake is applied to the rim 15 encircling the guide vane wheel 5, the other brake being released. The fluid discharged by the impeller 3 impinges on the 1st stage vanes 8 of the driven vane wheel 4, driving the latter in a forward direction. The fluid then passes through the guide vane wheel 5 and the 2nd stage vanes 9 of the driven vane wheel and hence back to the impeller.

When a heavy torque is imposed on the driven shaft 2 the speed of the driven vane wheel 4 is low relative to the impeller speed and the direction of whirl of the fluid discharged from the said driven vane wheel is counterclockwise (according to arrow a). The guide vane member 5 is therefore held stationary by means of the free-wheel clutch and it deflects the energised fluid to impinge on the 2nd stage vanes 9 of the driven vane wheel 4. Under these conditions the toothed annulus 11 is held stationary by the guide vane wheel 5, the sun wheel 10 rotates with the driven vane wheel 4 and the planetary wheels 13 rotate the driven shaft 2 at a reduced speed and correspondingly increased torque relative to the driven vane wheel.

With a decreasing torque imposed on the driven shaft 2 its speed, together with the speed of the driven vane wheel, correspondingly increases relative to the impeller and the aforesaid whirl in a counterclockwise direction diminishes finally changing to and increasing in a clockwise direction. Thus, at a predetermined torque on the driven shaft 2 the energy of the fluid discharged from the 1st stage vanes 8 of the driven vane wheel 4, directed in a clockwise direction into the guide vane wheel 5, is sufficient to overcome the reaction imposed on the toothed annulus 11 by the driven shaft and the guide vane wheel and toothed annulus are driven in a clockwise direction. The speeds of clockwise rotation of the sun wheel 10 and toothed annulus 11 thereafter increases with decreasing torque in the driven shaft 2 and consequently the latter is driven at an increasing speed relative to the driving shaft 1.

To obtain reverse operation the brake is released from the ring 15 and the corresponding brake applied to the driven vane wheel 4 whereupon the driven and guide vane wheels 4 and 5 exchange functions the former, together with the sun wheel 10 being held stationary and the latter rotating with the toothed annulus 11 in a counter-clockwise direction. Thus the driven shaft 2 is driven by the epicyclic gear train in the reverse direction at reduced speed and corresponding increased torque relative to the guide vane wheel.

The vanes of the guide vane wheel 5 may be so formed that said wheel can rotate, under the action of the fluid stream, at such higher speed than the impeller 3 that the epicyclic gear train rotates the driven shaft 2 at a higher speed than that of the driving shaft 1 when relatively light loads are imposed on the driven shaft, thus giving an "over-drive" effect to the hydraulic transmission gear.

It is to be understood that the invention need not be restricted to hydraulic transmission gears or torques converters of the reversible type as it is equally applicable to the non-reversible type. In this latter case the driven and guide vane wheels would not exchange functions and the means for braking them against rotation would be dispensed with. The one-way clutch would however, be fitted to the guide vane wheel in order to hold it stationary or allow it to rotate in a forward direction in accordance with the load on the driven shaft.

I claim:

1. An hydraulic power transmission of the Föttinger type comprising a driving and a driven element, an impeller vane member on the driving element, a rotatable vane member adjacent the impeller and a second rotatable vane member adjacent the first rotatable vane member, said vane members cooperating to form a fluid-power transmitting circuit, means for selectively preventing rotation of either of said first and second rotatable vane members and an epicyclic gear of which a planet wheel is carried by said driven element and the sun wheel and annulus are respectively connected to the said rotatable vane members.

2. An hydraulic power transmission of the Föttinger type, comprising a driving and a driven element, an impeller on the driving element, a rotatable vane member adjacent the impeller and a second rotatable vane member adjacent the first rotatable vane member, said vane members cooperating to form a fluid-power transmitting circuit, means for preventing rotation of said first rotatable member, means for preventing rotation of the second rotatable member in the reverse direction to that of the first member and an epicyclic gear of which the planet wheels are carried by the driven element and the annulus and sun wheel are respectively connected to said two rotatable vane members.

3. An hydraulic power transmission of the Föttinger type, comprising a driving and a driven element, an impeller on the driving element, a rotatable vane member adjacent the impeller and a second rotatable vane member adjacent the first rotatable vane member, said vane members cooperating to form a fluid-power transmitting circuit brake means for preventing rotation of said first member, a one-way brake device for preventing rotation of the second member in the direction reverse to that of the first member, and an epicyclic gear of which a planet wheel is carried by the driven element and the annulus and sun wheel of said gear are respectively connected to said two rotatable vane members.

4. An hydraulic power transmission of the Föttinger type comprising a driving and a driven element, an impeller on the driving element, a rotatable vane member adjacent the impeller and a second rotatable vane member adjacent the first rotatable vane member, said vane members cooperating to form a fluid-power transmitting circuit, the vanes of said second vane member being formed so that it can rotate under the action of the fluid stream at a greater speed than the impeller, means for preventing rotation of said first rotatable member, means for preventing rotation of the second rotatable member in the reverse direction to that of the first member and an epicyclic gear of which a planet wheel is carried by the driven element and the annulus and sun wheel of said gear are respectively connected to said two rotatable vane members.

5. An hydraulic power transmission of the Föttinger type, comprising a driving and a driven element, a driving vane member on the driving element, a rotatable vane member adjacent the driving vane member and a second rotatable vane member adjacent the first rotatable vane member, said vane members cooperating to form a fluid-power transmitting circuit, a one-way brake device for preventing rotation of the second rotatable member in the direction reverse to that of the first rotatable member, and an epicyclic gear of which a planet wheel is carried by the driven element and the annulus and sun wheel of said gear are respectively connected to said two rotatable vane members, the vanes of said second rotatable vane member being formed to give an "overdrive" effect to the said member with reference to the driving vane member.

6. An hydraulic power transmission of the Föttinger type, comprising a driving and a driven element, a driving vane member on the driving element, a rotatable vane member adjacent the driving vane member and a second rotatable vane member adjacent the first rotatable vane member, said vane members cooperating to form a fluid-power transmitting circuit, means for preventing rotation of the second rotatable member in the reverse direction to that of the first rotatable member and an epicyclic gear of which a planet wheel is carried by the driven element and the annulus and sun wheel of said gear are respectively connected to said two rotatable vane members.

7. An hydraulic power transmission of the Föttinger type, comprising a driving and a driven element, a driving vane member on the driving element, a rotatable vane member adjacent the driving vane member and a second rotatable vane member adjacent the first rotatable vane member, said vane members cooperating to form a fluid-power transmitting circuit, a brake for said first rotatable member, means for operating said brake, a rotatable element on said second rotatable member, a one-way coupling between said rotatable element and the vane member, a brake for said rotatable element and means for operating said brake and an epicyclic gear whereof the planet wheels are carried by the driven element, the sun wheel and the internally toothed annulus are respectively carried by said rotatable vane members.

8. In combination with an hydraulic power transmission of the Föttinger type, comprising a driving and a driven element, a driving vane member on the driving element, a rotatable vane member adjacent the driving vane member and a second rotatable vane member adjacent the first rotatable vane member, said vane members cooperating to form a fluid-power transmitting circuit, a brake for said first rotatable member, means for operating said brake, a rotatable element on said second rotatable member, a one-way coupling between said rotatable element and the last mentioned vane member, a brake for said rotatable element and means for operating said brake, a shaft on which the first rotatable vane member is mounted and a sleeve on the second rotatable vane member rotatably mounted on said shaft and an epicyclic gear of which the planet wheels are carried by the driven shaft, the sun wheel is carried by said second mentioned shaft and the internally toothed annulus is carried by said sleeve.

9. An hydraulic transmission gear comprising in combination a driving shaft, a driven shaft, an impeller on the driving shaft, a vane member on the driven shaft, an intermediate vane-member these vane members being adapted to function alternately as driven and guide elements, a gear connecting the first mentioned vane member with the driven shaft and braking means adapted to act on both the vane members and means for applying and releasing the brakes.

10. An hydraulic transmission gear comprising in combination a driving shaft, a driven shaft, an impeller on the driving shaft, two independently rotatable vane-carrying members, a fixed casing, a peripheral brake surface on each member, a brake band for each surface and held by the casing, means for operating said brake bands and an epicyclic gear whose planet wheels are carried by the driven shaft and an internally toothed annulus and sun wheel respectively connected to said vane-carrying members.

11. An hydraulic transmission gear comprising in combination a driving shaft, a driven shaft, an impeller on the driving shaft, two independently rotatable vane-carrying members, a one way clutch on one member, a peripheral brake surface on the clutch, a peripheral brake surface on one of the members, brake bands adapted to act on the surfaces, means for applying the brakes alternately, and an epicyclic gear whose planet wheels are carried by the driven shaft and an internally toothed annulus and sun wheel respectively connected to said vane carrying members.

WILLEM PETRUS van LAMMEREN.